(12) United States Patent
Tseng et al.

(10) Patent No.: US 10,451,146 B2
(45) Date of Patent: Oct. 22, 2019

(54) TWO-SPEED TRANSMISSION HAVING TWO CLUTCHES FOR ELECTRIC VEHICLE

(71) Applicant: INDUSTRIAL TECHNOLOGY RESEARCH INSTITUTE, Hsinchu (TW)

(72) Inventors: Jui-Tang Tseng, Hsinchu (TW); Kun-Ju Xie, Changhua County (TW); Chia Tsao, New Taipei (TW); Tsung-Han Wu, Kaohsiung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 394 days.

(21) Appl. No.: 15/075,267

(22) Filed: Mar. 21, 2016

(65) Prior Publication Data

US 2017/0204940 A1   Jul. 20, 2017

(30) Foreign Application Priority Data

Jan. 15, 2016   (TW) .............................. 105101239 A (51) Int. Cl.
*F16H 3/091* (2006.01)
*F16H 37/08* (2006.01)
(Continued)

(52) U.S. Cl.
CPC .............. *F16H 3/091* (2013.01); *B60K 1/00* (2013.01); *B60K 17/06* (2013.01); *F16D 13/385* (2013.01);
(Continued)

(58) Field of Classification Search
CPC .... F16H 3/091; F16H 37/0813; F16D 13/385; F16D 13/76; F16D 25/10; B60K 1/00; B60K 17/06
See application file for complete search history.

(56) References Cited

U.S. PATENT DOCUMENTS 2,856,048 A * 10/1958 Carlson .................. F16D 13/56
3,073,424 A * 1/1963 Russell ................. F16D 13/648
(Continued)

FOREIGN PATENT DOCUMENTS

CN   2575083 Y   9/2003
CN   102483100 A   5/2012
(Continued)

OTHER PUBLICATIONS

Vera Nikolic et al., "Dynamic Model for the Stress and Strain State Analysis of a Spur Gear Transmission", Journal of Mechanical Engineering, vol. 58, No. 1, pp. 56-67, 2012.
(Continued)

*Primary Examiner* — Tinh T Dang
(74) *Attorney, Agent, or Firm* — Rabin & Berdo, P.C.

(57) ABSTRACT

A two-speed transmission having two clutches for an electric vehicle includes an electric motor, a middle shaft, a first clutch, a second clutch, a first gear assembly and a second gear assembly. The electric motor includes a spindle. The first and second clutches are furnished on the middle shaft coaxially. The first gear assembly is furnished on the spindle and the first clutch respectively to generate a first gear ratio. The second gear assembly is furnished on the spindle and the first clutch respectively to generate a second gear ratio different from the first gear ratio. When the first clutch is activated to connect with the middle shaft, the second clutch separates from the middle shaft, and the electric motor outputs a first torque corresponding to the first gear ratio to the middle shaft. Similarly, the electric motor outputs a second torque corresponding to the second gear ratio.

11 Claims, 5 Drawing Sheets

(51) Int. Cl.
*F16D 13/38* (2006.01)
*F16D 13/76* (2006.01)
*F16D 25/10* (2006.01)
*B60K 1/00* (2006.01)
*B60K 17/06* (2006.01)
*F16H 3/089* (2006.01)
*F16D 25/0638* (2006.01)

(52) U.S. Cl.
CPC ............ *F16D 13/76* (2013.01); *F16D 25/10* (2013.01); *F16H 3/089* (2013.01); *F16H 37/0813* (2013.01); *B60K 2001/001* (2013.01); *F16D 25/0638* (2013.01); *F16H 2200/0034* (2013.01)

(56) References Cited

U.S. PATENT DOCUMENTS

| | | | |
|---|---|---|---|
| 3,541,886 A * | 11/1970 | Bookout | F16H 3/66 475/285 |
| 5,417,125 A * | 5/1995 | Janiszewski | B60K 17/06 74/359 |
| 7,094,171 B2 | 8/2006 | Inoue | |
| 7,186,203 B2 | 3/2007 | Tabata et al. | |
| 7,217,216 B2 | 5/2007 | Inoue | |
| 7,429,228 B2 | 9/2008 | Hiraiwa | |
| 8,235,853 B2 | 8/2012 | Lutoslawski | |
| 8,517,882 B2 | 8/2013 | Wenthen | |
| 9,771,984 B2 * | 9/2017 | Vierk | F16D 13/52 |
| 9,822,860 B2 * | 11/2017 | Kaltenbach | F16H 37/0813 |
| 2003/0015392 A1 * | 1/2003 | Shoji | F16D 25/0638 192/85.34 |
| 2003/0168306 A1 * | 9/2003 | Gorman | F16D 25/0638 192/85.25 |
| 2010/0216584 A1 | 8/2010 | Lutoslawski | |
| 2010/0285914 A1 | 11/2010 | Wenthen | |
| 2012/0316023 A1 * | 12/2012 | Bausch | B60K 1/00 475/150 |
| 2014/0311284 A1 * | 10/2014 | Chen | B60K 6/547 74/661 |
| 2015/0001031 A1 * | 1/2015 | Ren | B60K 17/02 192/85.01 |

FOREIGN PATENT DOCUMENTS

| | | |
|---|---|---|
| CN | 102801245 B | 11/2012 |
| CN | 202812017 U | 3/2013 |
| CN | 103032526 A | 4/2013 |
| CN | 103047313 A | 4/2013 |
| CN | 103115114 A | 5/2013 |
| CN | 104054241 A | 9/2014 |
| CN | 204123962 U | 1/2015 |
| CN | 104482137 A | 4/2015 |
| CN | 104500616 A | 4/2015 |
| CN | 204327880 U | 5/2015 |
| CN | 105299153 A | 2/2016 |
| TW | M454345 U1 | 6/2013 |
| TW | 201343467 A | 11/2013 |
| TW | I428247 B | 3/2014 |
| TW | I454393 B | 10/2014 |

OTHER PUBLICATIONS

A.R. Crowther et al., "Torsional finite elements and nonlinear numerical modelling in vehicle powertrain dynamics", Journal of Sound and Vibration, vol. 284, pp. 825-849, 2005.

Shrenik M. Patil et al., "Modal and Stress Analysis of Differential Gearbox Casing with Optimization", Int. Journal of Engineering Research and Applications, vol. 3, Issue 6, pp. 188-193, Nov.-Dec. 2013.

Rajesh Purohit et al., "Design and Finite Element Analysis of an Automotive Clutch Assembly", Procedia Materials Science, vol. 6, pp. 490-502, 2014.

Koos van Berkel et al., "Fast and smooth clutch engagement control for dual-clutch transmissions", Control Engineering Practice, vol. 22, pp. 57-68, Jan. 2014.

Tristan M. Ericson et al., "Planetary gear modal vibration experiments and correlation against lumped-parameter and finite element models", Journal of Sound and Vibration, vol. 332, pp. 2350-2375, Jan. 29, 2013.

Taiwanese Office Action dated May 9, 2017.
Chinese Office Action dated Sep. 25, 2018.

* cited by examiner

TWO-SPEED TRANSMISSION HAVING TWO CLUTCHES FOR ELECTRIC VEHICLE

This application claims the benefit of Taiwan application Serial No. 105101239, filed Jan. 15, 2016, the disclosure of which is incorporated by reference herein in its entirety.

TECHNICAL FIELD

The disclosure relates in general to a transmission having two clutches, and more particularly to a two-speed transmission for an electric vehicle and capable of providing different torques by switching the speed gears of different gear ratios.

BACKGROUND

As electric vehicles are getting more and more popular, the performance of a transmission is getting more and more important. Most of existing electric vehicles adopt one-speed transmission with a constant gear ratio of 6.4:1~7.5:1. Under such circumstance, when the vehicle is driving up the slope, the one-speed transmission cannot provide a higher torque; and when the vehicle is driving on a flat road, the one-speed transmission cannot provide a higher speed due to the restriction of the transmission gear ratio.

Since existing one-speed transmissions cannot be effectively used, many problems will arise. For example, the climbing capability is poor, the start-up is energy consuming, and the efficiency is low. When the vehicle is driving down the slope and the speed is accelerated, the electric motor may be dragged, and to the worse, may even be burnt down.

SUMMARY

The disclosure is directed to a two-speed transmission having two clutches for an electric vehicle capable of providing two gear ratios to satisfy the driver's different requirements of driving the vehicle at a high torque or driving the vehicle at a high speed respectively. The two-speed transmission having two clutches has the features of high energy utilization rate and strong climbing capacity.

According to one embodiment, a two-speed transmission having two clutches for an electric vehicle is provided. The two-speed transmission having two clutches for an electric vehicle includes an electric motor, a middle shaft, a first clutch, a second clutch, a first gear assembly and a second gear assembly. The electric motor includes a spindle. The first clutch and the second clutch are furnished on the middle shaft coaxially. The first gear assembly is furnished on the spindle and the first clutch respectively to generate a first gear ratio. The second gear assembly is furnished on the spindle and the second clutch respectively to generate a second gear ratio different from the first gear ratio. When the first clutch is activated to connect with the middle shaft, the second clutch separates from the middle shaft, the rotor of the electric motor outputs a first torque corresponding to the first gear ratio to the middle shaft. When the second clutch is activated to connect with the middle shaft, the first clutch separates from the middle shaft, the rotor of the electric motor outputs a second torque corresponding to the second gear ratio to the middle shaft.

The above and other aspects of the disclosure will become better understood with regard to the following detailed description of the preferred but non-limiting embodiment(s). The following description is made with reference to the accompanying drawings.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

In an embodiment of the disclosure, the transmission has two switchable clutches. As one clutch connects with the middle shaft and the other clutch separates from the middle shaft, different gear ratios can be provided to meet different requirements of providing a high torque when the vehicle is driving up the slope and achieving a high rotation speed when the vehicle is driving on a flat road. Thus, the climbing capability can be improved and the energy utilization rate can be increased.

In an embodiment, two gear assemblies with different gear ratios are respectively installed on the spindle of the electric motor and are controlled by respective clutches. When the first clutch connects with the middle shaft, the second clutch separates from the middle shaft. Meanwhile, the rotor of the electric motor drives the first gear assembly to rotate and output a first torque corresponding to the gear ratio of the first gear assembly to the middle shaft. Then, the middle shaft gear is meshed with the differential via an output shaft gear to transfer the first torque to the power output shaft of the vehicle.

Besides, when the first clutch separates from the middle shaft, the second clutch connects with the middle shaft. Meanwhile, the rotor of the electric motor drives the second gear assembly to rotate and output a second torque corresponding to the gear ratio of the second gear assembly to the middle shaft. Then, the second gear assembly is meshed with the differential via the output shaft gear to transfer the second torque to the power output shaft of the vehicle.

The first torque is a high torque corresponding to the first gear assembly with a high gear ratio under which the vehicle can achieve a low rotation speed but a high torque. The high gear ratio is applicable to the vehicle starting up or driving up or down the slope. The second torque is a low torque corresponding to the second gear assembly with a low gear ratio. Under the low gear ratio, the vehicle can achieve a high rotation speed but a low torque. The low gear ratio is applicable to the vehicle driving on a flat road.

A number of embodiments are disclosed below for elaborating the disclosure. However, the embodiments of the disclosure are for detailed descriptions only, not for limiting the scope of protection of the disclosure.

Figure 1A:
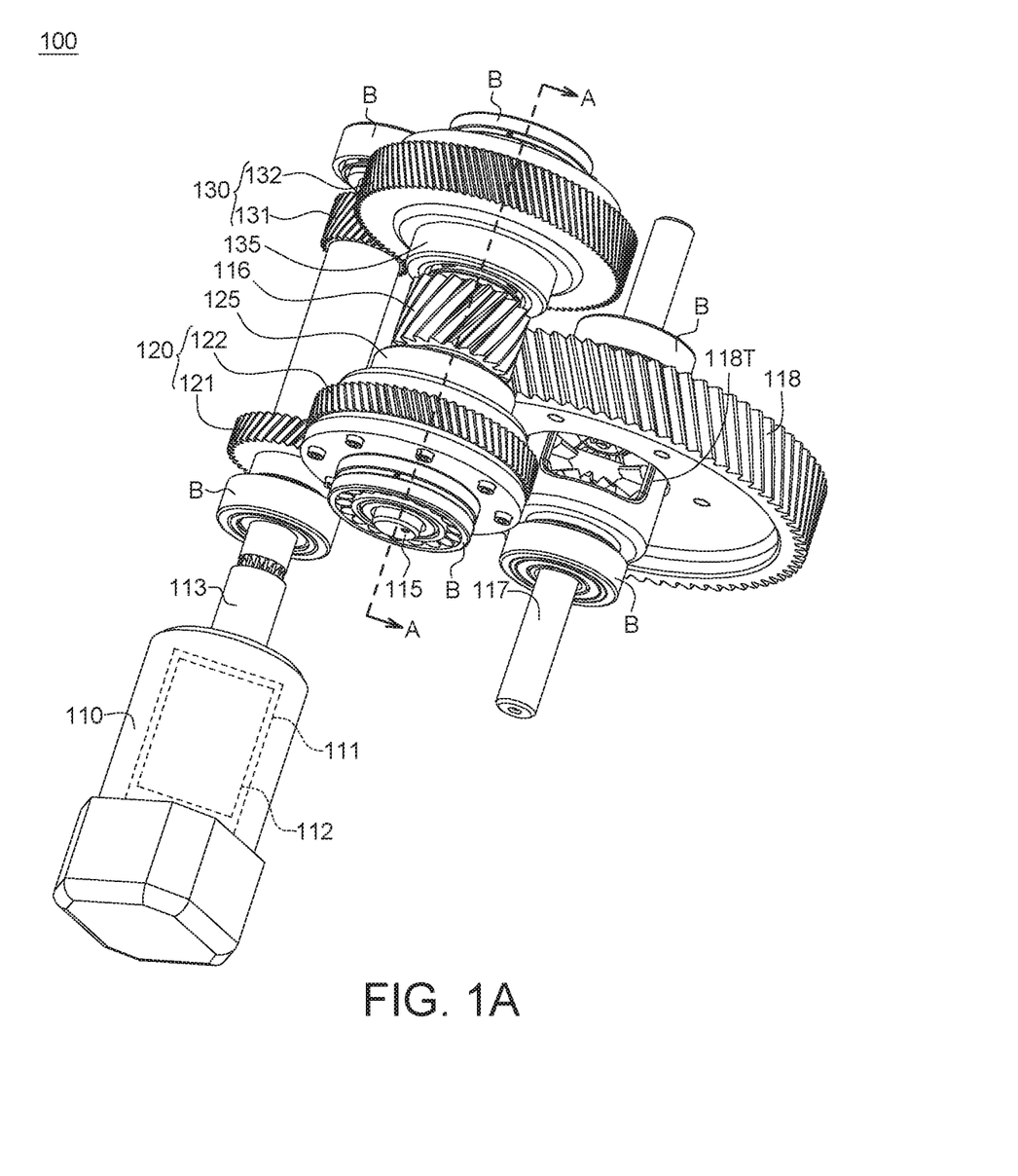
FIGS. 1A and 1B respectively are an appearance diagram of a two-speed transmission for an electric vehicle and a cross-sectional view along a cross-sectional line A-A thereof according to an embodiment of the disclosure.
Figure 1B:
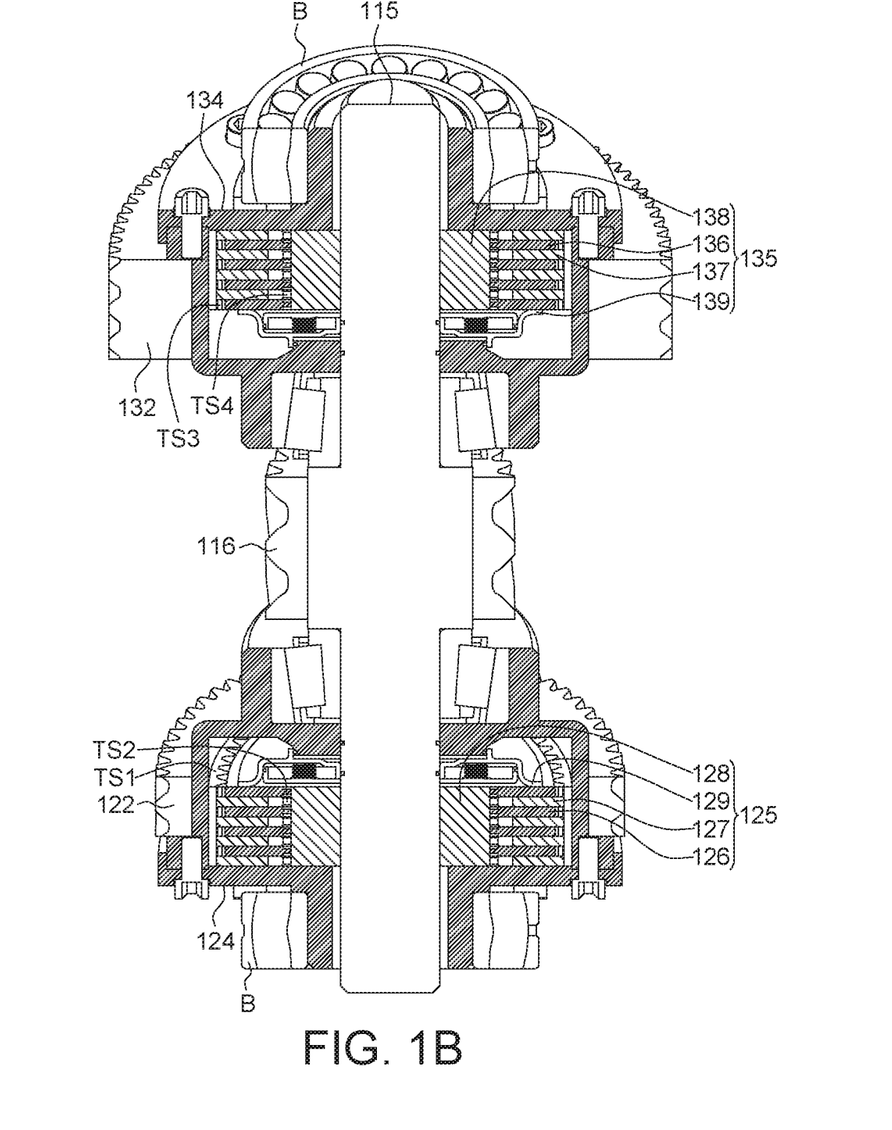
Figure 2:
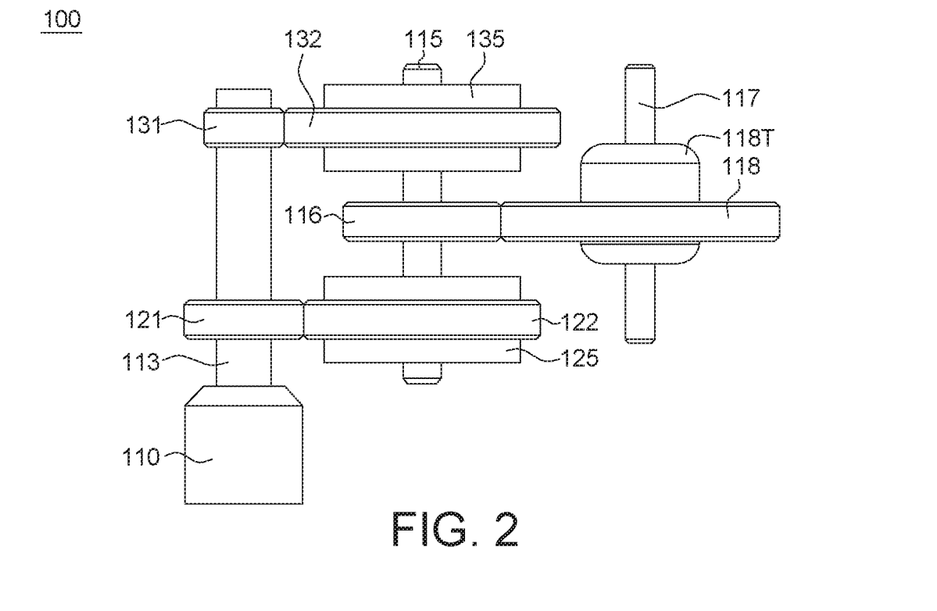
FIG. 2 is a schematic diagram of a two-speed transmission for an electric vehicle of FIG. 1A according to an embodiment of the disclosure.
Figure 3:
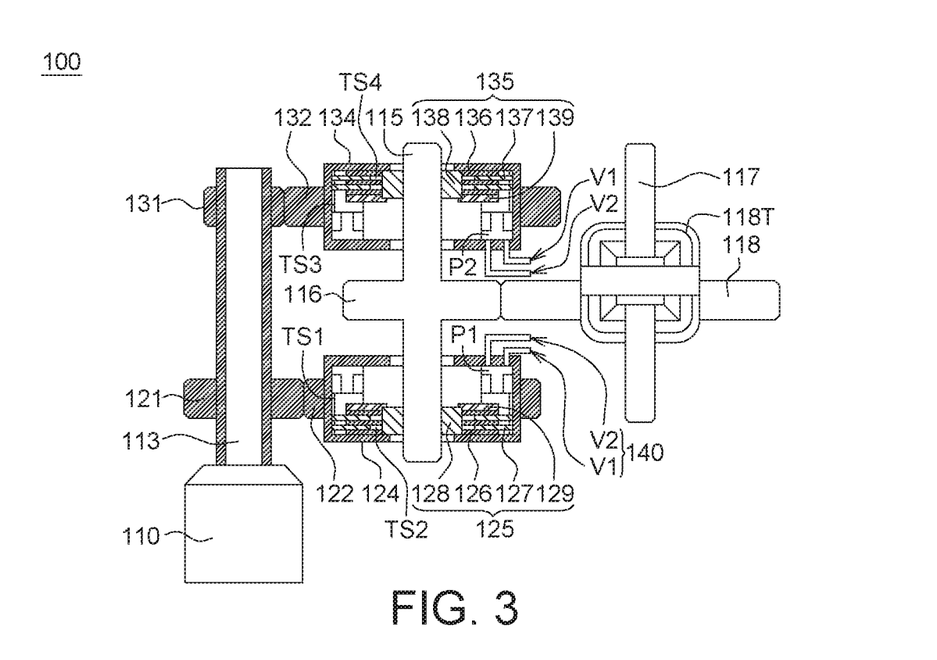
FIGS. 3 and 4 respectively are an internal structural diagram and a simplified reference diagram of a two-speed transmission for an electric vehicle according to an embodiment of the disclosure.
Figure 4:
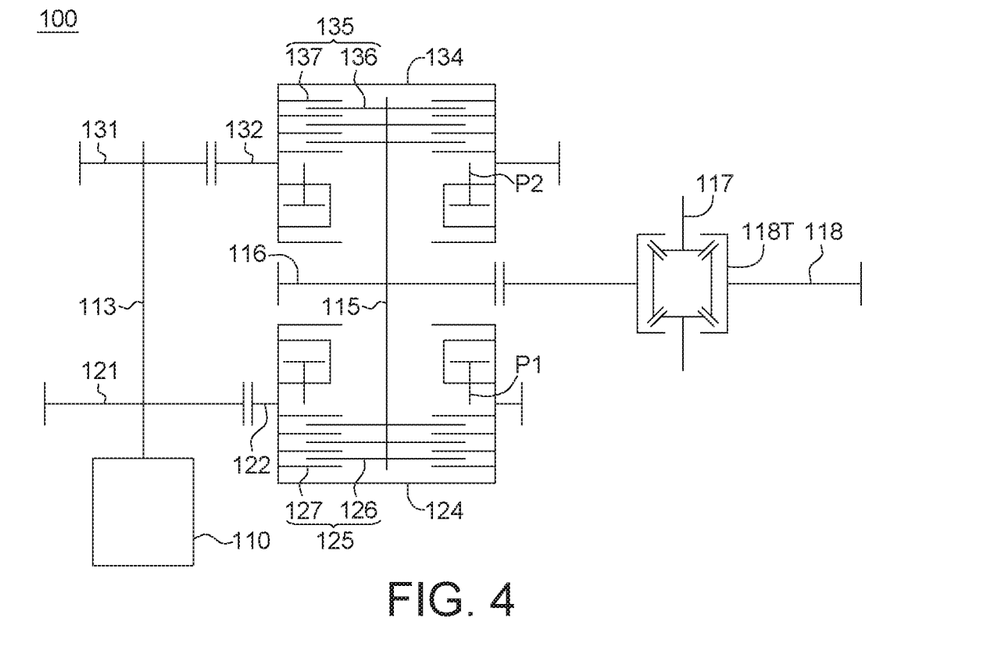

Refer to FIGS. 1~4. FIGS. 1A and 1B respectively are an appearance diagram of a two-speed transmission 100 for an electric vehicle and a cross-sectional view along a cross-sectional line A-A thereof according to an embodiment of the disclosure. FIG. 2 is a schematic diagram of a two-speed transmission 100 for an electric vehicle of FIG. 1A according to an embodiment of the disclosure. FIGS. 3 and 4 respectively are an internal structural diagram and a simplified reference diagram of a two-speed transmission 100 for an electric vehicle according to an embodiment of the disclosure.

As indicated in FIGS. 1A, 1B and 2, the two-speed transmission 100 for an electric vehicle includes an electric motor 110, a middle shaft 115, a first gear assembly 120, a first clutch 125, a second gear assembly 130 and a second clutch 135. The electric motor 110 includes a stator 111, a rotor 112 and a spindle 113. The stator 111 is fixed on the housing of the electric motor 110. The center of the rotor 112 connects with the spindle 113 and drives the spindle 113 to rotate. The spindle 113 can output the power of the electric motor 110 to a driving mechanism, such as a differential gear 118, a differential 118T and a power output shaft 117 of a vehicle. In an embodiment, the electronic control unit (ECU) detects vehicle speed and road conditions by using an external sensor. The ECU can switch the two-speed transmission 100 for an electric vehicle between a first shift mode and a second shift mode to adjust the gear ratio of the transmission, such that the power outputted by the electric motor 110 can meet the requirement of providing a high torque or achieving a high rotation speed.

As indicated in FIG. 1A, each of the spindle 113, the middle shaft 115 and the power output shaft 117 has two bearings B, such as ball bearings, via which the spindle 113, the middle shaft 115 and the power output shaft 117 can be firmly installed within the body of the two-speed transmission 100 for an electric vehicle.

The first gear assembly 120 includes a first main gear 121 and a first counter gear 122. The second gear assembly 130 includes a second main gear 131 and a second counter gear 132. The first main gear 121 and the second main gear 131 are furnished on the spindle 113 of the electric motor 110 and synchronically rotate with the spindle 113. The first counter gear 122 is furnished on the first clutch 125 and meshed with the first main gear 121 to generate a first gear ratio. The second counter gear 132 is furnished on the second clutch 135 and meshed with the second main gear 131 to generate a second gear ratio.

The first gear assembly 120 transfers the power of the electric motor 110 as a first torque, and further outputs the first torque to the middle shaft 115. Then, the middle shaft gear 116 furnished on the middle shaft 115 is meshed with the differential gear 118 which drives the differential 118T to rotate and transfer the first torque to the power output shaft 117 of the vehicle. In another embodiment, the middle shaft gear 116 and the differential gear 118 are coupled by a belt or other moving parts to output the first torque.

The second gear assembly 130 transfers the power of the electric motor 110 as a second torque, and further outputs the second torque to the middle shaft 115. Then, the middle shaft gear 116 furnished on the middle shaft 115 is meshed with the differential gear 118 which drives the differential 118T to rotate and transfer the second torque to the power output shaft 117 of the vehicle. In another embodiment, the middle shaft gear 116 and the differential gear 118 are coupled by a belt or other moving parts to output the second torque.

As disclosed above, two gear assemblies with different gear ratios are used in conjunction with a clutch controller to switch the speed gears of different gear ratios and provide different torques to the power output shaft 117 of the vehicle, such that the different requirements of high torque or high speed can be satisfied. The gear ratio is a ratio of the number of teeth of the output gear to the number of teeth of the input gear. The first gear ratio, such as between 6~7, is applicable to the situation when a high rotation speed is required. The second gear ratio, such as 11~12, is applicable to the situation when a high torque is required. The definition of the first gear ratio and the definition of the second gear ration are exchangeable, and the disclosure does not have specific restrictions to the gear ratio.

Refer to FIGS. 3 and 4. The first clutch 125 and the second clutch 135 can be a set of friction-plate clutches. The first clutch 125 includes a plurality of first static friction plates 126 furnished on the clutch centering sleeve 128 and a plurality of first dynamic friction plates 127 staggered with the first static friction plates 126 and neighboring with the first static friction plates 126 to each other. The second clutch 135 includes a plurality of second static friction plates 136 furnished on the clutch centering sleeve 138 and a plurality of second dynamic friction plates 137 staggered with the second static friction plates 136 and neighboring with the second static friction plates 136 to each other.

The first counter gear 122 is furnished on the housing 124 of the first clutch 125, the first dynamic friction plates 127 are furnished on the inner-wall of the housing 124 of the first clutch 125, and the first dynamic friction plates 127 match the inner spline TS1 furnished on the housing 124 of the first clutch 125 and extended in an axial direction, such that the first dynamic friction plates 127 can move on the inner spline TS1 along the axial direction. The first dynamic friction plates 127 rotate around the middle shaft 115 via the rotation of the housing 124 of the first clutch 125. The first static friction plates 126 match the outer spline TS2 furnished on the clutch centering sleeve 128 and extended in an axial direction, such that the first static friction plates 126 can move on the outer spline TS2 along the axial direction. A first pressure disc 129 is furnished on the clutch centering sleeve 128. The first pressure disc 129 can be driven by the hydraulic circuit 140 to move along an axial direction of the middle shaft 115 and push the first static friction plates 126 to tightly connect with the first dynamic friction plates 127.

Figure 5A:
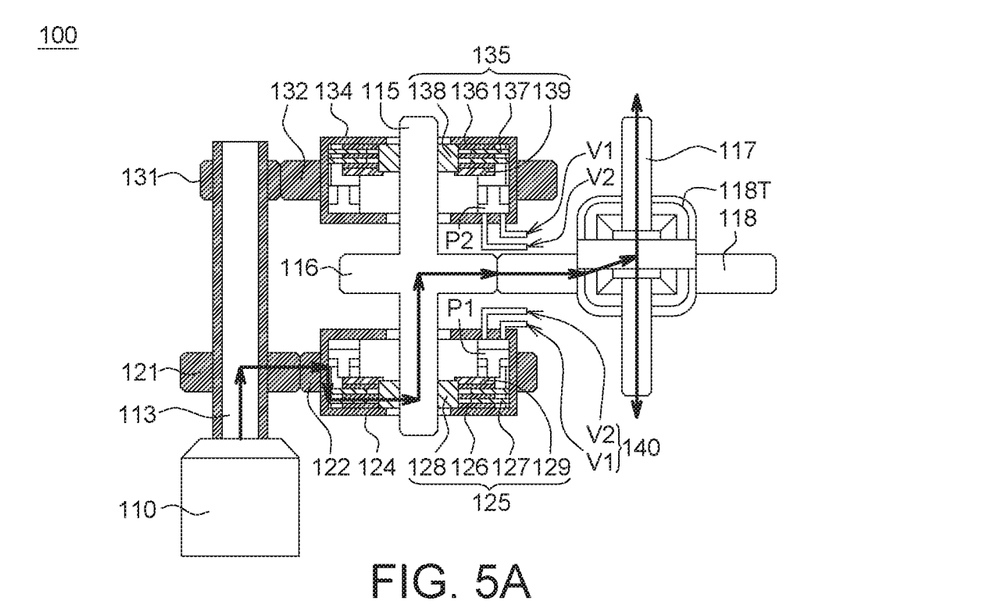
FIGS. 5A-5C respectively are operation diagrams of a two-speed transmission for an electric vehicle according to an embodiment of the disclosure.

FIGS. 5A~5C respectively are operation diagrams of a two-speed transmission 100 for an electric vehicle according to an embodiment of the disclosure. Refer to FIGS. 3, 4 and 5A. When the first piston P1 is pushed on by the hydraulic circuit 140, the first pressure disc 129 furnished on the clutch centering sleeve 128 is activated by the first piston P1 to tightly press the first static friction plates 126 and the first dynamic friction plates 127, such that the first static friction plates 126 and the first dynamic friction plates 127 tightly connect with each other. The first static friction plates 126 are furnished on the clutch centering sleeve 128 which further couples to the middle shaft 115. After the first static friction plates 126 and the first dynamic friction plates 127 are tightly pressed by the first pressure disc 129, the first torque outputted from the electric motor 110 (the rotor 112) can be transferred to the middle shaft gear 116, the differential 118T and the power output shaft 117 by the first clutch 125 connecting with the middle shaft 115 via a transmission path represented by arrow signs as indicated in FIG. 5A. Conversely, after the first pressure disc 129 is released and returns to the original position, the first static friction plates 126 and the first dynamic friction plates 127 do not connect with each other, therefore the first torque outputted from the electric motor 110 will not be transferred to the middle shaft 115.

Besides, the second counter gear 132 is furnished on the housing 134 of the second clutch 135, the second dynamic friction plates 137 are furnished on the inner-wall of the housing 134 of the second clutch 135, and the second dynamic friction plates 137 match the inner spline TS3 furnished on the inner-wall of the housing 134 of the second clutch 135 and extended along an axial direction, such that the second dynamic friction plates 137 can move on the inner spline TS3 along the axial direction. The second dynamic friction plates 137 synchronically rotate around the middle shaft 115 via the rotation of the housing 134 of the second clutch 135. Moreover, the second static friction plates 136 match the outer spline TS4 furnished on the clutch centering sleeve 138 and extended along an axial direction, such that the second static friction plates 136 can move on the outer spline TS4 along the axial direction. A second pressure disc 139 is furnished on the clutch centering sleeve 138. The second pressure disc 139 can be driven by the hydraulic circuit 140 to move along an axial direction of the middle shaft 115 and push the second static friction plates 136 to tightly connect with the second dynamic friction plates 137.

Figure 5B:
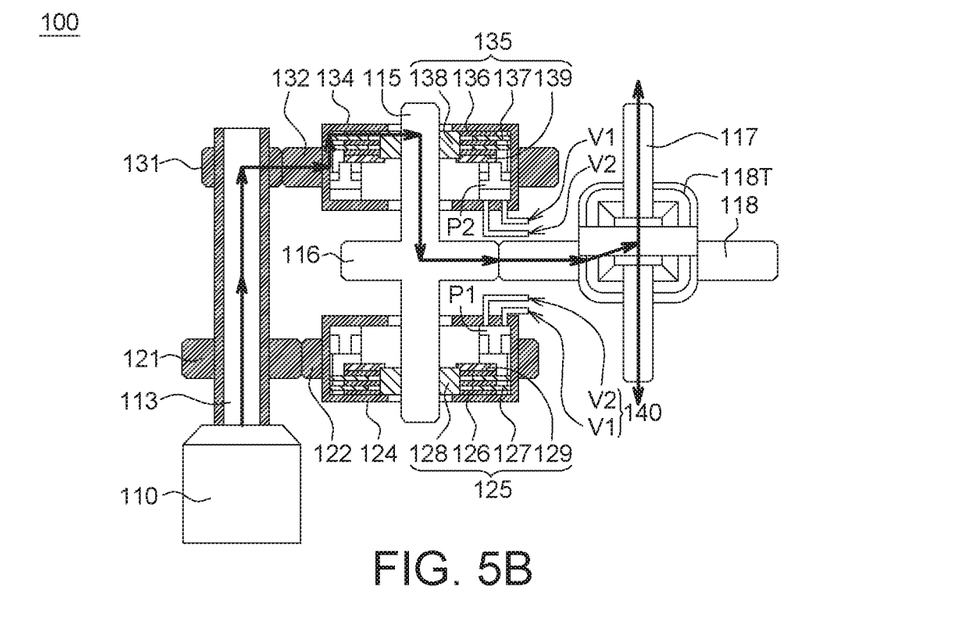

Refer to FIGS. 3, 4 and 5B. When the second piston P2 is pushed on by the hydraulic circuit 140, the second pressure disc 139 furnished on the clutch centering sleeve 138 is activated by the second piston P2 to tightly press the second static friction plates 136 and the second dynamic friction plates 137, such that the second static friction plates 136 and the second dynamic friction plates 137 tightly connect with each other. The second static friction plates 136 are furnished on the clutch centering sleeve 138 which further couples to the middle shaft 115. After the second static friction plates 136 and the second dynamic friction plates 137 are tightly pressed by the second pressure disc 139, the second torque outputted from the electric motor 110 (the rotor 112) can be transferred to the middle shaft gear 116, the differential 118T and the power output shaft 117 by the second clutch 135 connecting with the middle shaft 115 via a transmission path represented by arrow signs as indicated in FIG. 5B. Conversely, after the second pressure disc 139 is released and returns to the original position, the second static friction plates 136 and the second dynamic friction plates 137 do not connect with each other, therefore the first torque outputted from the electric motor 110 will not be transferred to the middle shaft 115.

Figure 5C:
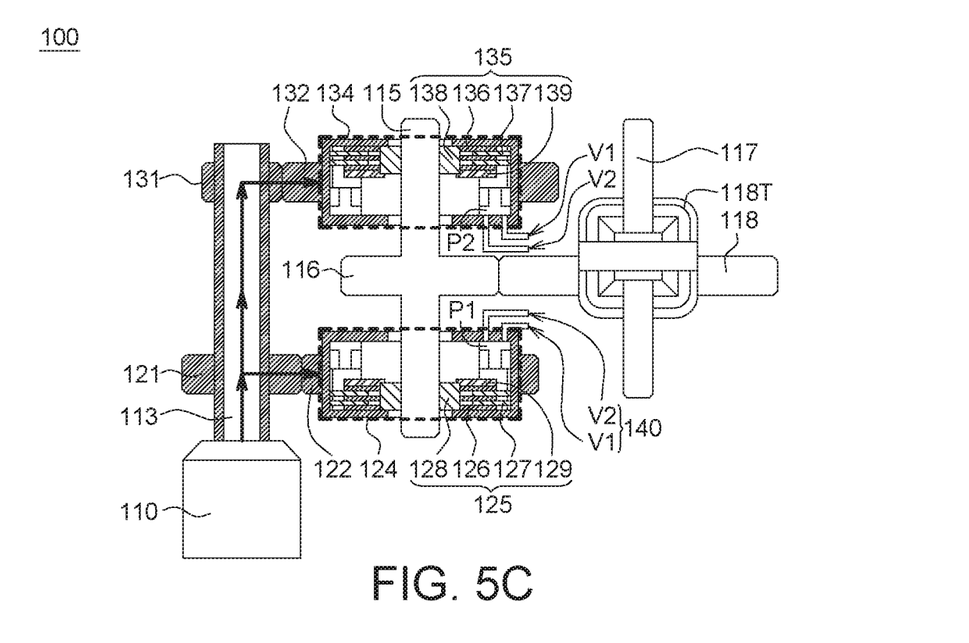

Refer to FIGS. 3, 4 and 5C. When the first clutch 125 and the second clutch 135 are not driven by the hydraulic circuit 140 and cannot connect with the middle shaft 115. Under such circumstance, the spindle 113 cannot output the power to the middle shaft 115, the rotor 112 is idled and no torque is outputted to the middle shaft 115, such that the electric motor 110 maintains at idle speed.

As disclosed above, the clutch controller controls the first clutch 125 and the second clutch 135 by using the first piston P1, the second piston P2 and the switching of the on/off state of the hydraulic circuit 140. That is, when the first static friction plates 126 and the first dynamic friction plates 127 of the first clutch 125 are pressed tightly to connect with each other, the second static friction plates 136 and the second dynamic friction plates 137 of the second clutch 135 separate from each other. Conversely, when the first static friction plates 126 and the first dynamic friction plates 127 of the first clutch 125 separate from each other, the second static friction plates 136 and the second dynamic friction plates 137 of the second clutch 135 are pressed tightly to connect with each other. Since the shifting operation of the clutches 125 and 135 is easy and reliable, the neutral gear, which may cause intermittent output of torque and make the vehicle jittering, can be avoided during the process of shifting gears, and driving comfort will thus be greatly improved.

Each of the two ports V1 and V2 of the hydraulic circuit 140 has a control valve (not illustrated) for controlling the pressure and flow of the ports V1 and V2 so as to adjust the internal pressure of the hydraulic cylinder. Since the hydraulic circuit 140 can be connected to one single pump through a pump switch and can further drive the first clutch 125 and the second clutch 135 by using the one single pump, the hydraulic circuit 140 has a simplified structure, a smaller volume and a lighter weight.

The two-speed transmission for an electric vehicle disclosed in above embodiments of the disclosure is capable of providing two gear ratios to satisfy the driver's different requirements of driving the vehicle at a high torque or driving the vehicle at a high speed respectively. The two-speed transmission having two clutches has the features of high energy utilization rate and strong climbing capacity. Additionally, the two-speed transmission of the disclosure, having a compact and robust structure, is light and small and easy to assemble, enhances the power of the electric vehicle and is beneficiary to the standardization and use of the electric vehicle.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:
1. A two-speed transmission having two clutches for an electric vehicle, comprising:
   an electric motor, comprising a spindle;
   a middle shaft;
   a middle shaft gear furnished on the middle shaft;
   a differential gear directly meshed with the middle shaft gear;
   a first clutch and a second clutch furnished on the middle shaft coaxially;
   a first gear assembly comprising a first main gear furnished on the spindle and a first counter gear furnished on a housing of the first clutch to generate a first gear ratio; and
   a second gear assembly comprising a second main gear furnished on the spindle and a second counter gear furnished on a housing of the second clutch to generate a second gear ratio different from the first gear ratio;
   wherein the first and second clutches are arranged to be disposed within the first and second counter gears;
   wherein the first clutch comprises a plurality of first static friction plates and a first pressure disc furnished on a first clutch centering sleeve and a plurality of first dynamic friction plates furnished on an inner-wall of the housing of the first clutch and movable on the inner-wall in an axial direction of the middle shaft, staggered with the first static friction plates and neighboring with the first static friction plates;

wherein the first pressure disc is activated to move and tightly press the first static friction plates and the first dynamic friction plates, such that the first static friction plates and the first dynamic friction plates tightly connect with each other and the housing of the first clutch is coupled to the middle shaft by the first pressure disc;

wherein the second clutch comprises a plurality of second static friction plates furnished on a second clutch centering sleeve and a plurality of second dynamic friction plates furnished on an inner-wall of the housing of the second clutch, staggered with the second static friction plates and neighboring with the second static friction plates;

wherein, when the first clutch is activated to connect with the middle shaft, the second clutch separates from the middle shaft, and the electric motor outputs a first torque corresponding to the first gear ratio to the middle shaft and the differential gear; and wherein, when the second clutch is activated to connect with the middle shaft, the first clutch separates from the middle shaft, and the electric motor outputs a second torque corresponding to the second gear ratio to the middle shaft and the differential gear.

2. The two-speed transmission for an electric vehicle according to claim 1, wherein when the first and the second clutch both do not connect with the middle shaft, a rotor within the electric motor is idled and no torque is outputted to the middle shaft.

3. The two-speed transmission for an electric vehicle according to claim 1, wherein the middle shaft gear and the first clutch and the second clutch are furnished on the middle shaft coaxially.

4. The two-speed transmission for an electric vehicle according to claim 1, further comprising a differential and a power output shaft, wherein the differential gear drives the differential to rotate and transfer the first torque or the second torque to the power output shaft.

5. The two-speed transmission for an electric vehicle according to claim 1, wherein the first pressure disc is driven in a hydraulic manner.

6. The two-speed transmission for an electric vehicle according to claim 1, wherein the second dynamic friction plates are furnished on an inner-wall of a housing of the second clutch and synchronically rotate around the middle shaft via the rotation of the second gear assembly.

7. The two-speed transmission for an electric vehicle according to claim 6, wherein the second dynamic friction plates match an inner spline furnished on the inner-wall of the housing of the second clutch in the axial direction of the middle shaft, such that the second dynamic friction plates are movable on the inner spline in the axial direction.

8. The two-speed transmission for an electric vehicle according to claim 1, wherein the second static friction plates match an outer spline furnished on the second clutch centering sleeve and extended in the axial direction of the middle shaft, such that the second static friction plates are movable on the outer spline in the axial direction.

9. The two-speed transmission for an electric vehicle according to claim 1, wherein a second pressure disc is furnished on the second clutch centering sleeve and is activated to move in the axial direction of the middle shaft and tightly press the second static friction plates and the second dynamic friction plates, such that the second static friction plates and the second dynamic friction plates tightly connect with each other.

10. The two-speed transmission for an electric vehicle according to claim 9, wherein the second pressure disc is driven in a hydraulic manner.

11. The two-speed transmission for an electric vehicle according to claim 1, wherein the first clutch and the second clutch are furnished at two ends of the middle shaft.

* * * * *